United States Patent [19]

Iwase et al.

[11] 3,906,169

[45] Sept. 16, 1975

[54] COMBINED PHONOGRAPH RECORD PLAYER AND MAGNETIC TAPE RECORDER FOR RECORDING ON TAPE THE CONTENT OF A PHONOGRAPH RECORD

[75] Inventors: Koichi Iwase, Chofu; Takahiko Saito, Kamakura; Schosuke Tanaka, Kawasaki, all of Japan

[73] Assignee: Sony Corporation, Tokyo, Japan

[22] Filed: Jan. 22, 1974

[21] Appl. No.: 435,468

[30] Foreign Application Priority Data

Jan. 22, 1973 Japan ................................ 48-10138

[52] U.S. Cl. ................ 179/100.1 A; 274/3; 360/15; 360/74; 360/79

[51] Int. Cl.[2] ........................................... G11B 13/02

[58] Field of Search ................ 179/100.1 A, 100.1 R, 179/100.4 R; 274/3; 360/15, 74, 79

[56] References Cited

UNITED STATES PATENTS

| | | | |
|---|---|---|---|
| 2,351,948 | 6/1944 | Gay | 179/100.41 R |
| 2,611,618 | 9/1952 | Camras | 179/100.1 A |
| 2,625,611 | 1/1953 | Roberts | 179/100.1 A |
| 2,706,637 | 4/1955 | Cain | 360/90 |
| 3,620,476 | 11/1971 | Cervantes | 274/3 |

*Primary Examiner*—Bernard Konick
*Assistant Examiner*—Stewart Levy
*Attorney, Agent, or Firm*—Lewis H. Eslinger; Alvin Sinderbrand

[57] ABSTRACT

In a combined phonograph record player and recorder having a first device operative to play a phonograph record and a second device, such as, a tape recorder, operative to record on a magnetic tape the content of a phonograph record being played by the first device; elements are provided for detecting a halt in the operation of either one of the devices, for example, the completion of the playing of the phonograph record or the lifting of the stylus therefrom prior to the completion of the playing thereof, or the interruption of the driving of the tape in the tape recorder, such as, by reason of the willful stopping of the tape driving or the automatic stopping of the tape driving due to the exhaustion of the supply of tape in the recorder, and the detection of a halt in the operation of either one of the devices causes a halt in the operation of the other of the devices.

11 Claims, 9 Drawing Figures

COMBINED PHONOGRAPH RECORD PLAYER AND MAGNETIC TAPE RECORDER FOR RECORDING ON TAPE THE CONTENT OF A PHONOGRAPH RECORD

BACKGROUND OF THE INVENTION

1. Field of the Invention

This invention relates generally to an apparatus having a phonograph record player device and a recorder device by which the content of a phonograph record being played by the phonograph record player device can be recorded on a record medium, such as, a magnetic tape.

2. Description of the Prior Art

In the existing apparatus of the above described type, the operation of the phonograph record player device and of the tape recorder device are not made interdependent even when the tape recorder device is employed to record the content of a phonograph record being played by the phonograph record player device. By reason of the foregoing, if the supply of tape in the recorder device becomes exhausted, and thereby effects the automatic shut-off of the tape recorder device, at a time when the playing of the phonograph record has not been completed, the phonograph record player device continues to operate until playing of the phonograph record has been completed and the tone arm has been returned to its rest position to effect the automatic shut-off of the phonograph record player device. Thus, after exhaustion of the tape supply in the recorder device and consequent shut-off of the latter, the content of the phonograph record being played is not recorded, and the continued operation of the phonograph record player device results in useless abrasion of the pick-up stylus and of the record groove. Furthermore, if the apparatus is observed only after the shut-off of the phonograph record player device, it is not possible to determine whether the full content of the phonograph record has been recorded and, if not, how much of the phonograph record content has been recorded and how much of the content remains to be recorded. Conversely, if the playing of the phonograph record is completed prior to the exhaustion of the supply of magnetic tape in the recorder device, the tape recorder device continues to operate until its automatic shut-off is achieved in response to the exhaustion of the tape supply. In such case, if the apparatus is observed only after the automatic shut-off of the tape recorder device, it is not possible to ascertain, without time consuming and troublesome rewinding and playing of the magnetic tape, how much of the tape is still available for recording of either the content of another phonograph record or other sounds. Accordingly, it is necessary with the existing apparatus of the described type to continuously monitor the joint operation of the phonograph record player device and the tape recorder device for the purpose of manually halting the operation of the phonograph record player device in the event that the supply of tape in the recorder device becomes exhausted prior to the completion of the playing of a phonograph record, or to manually halt the operation of the tape recorder device in the event that the playing of a phonograph record is completed prior to the exhaustion of the supply of tape in the recorder device. The need for such continuous supervision or monitoring is obviously an important disadvantage of the existing apparatus.

SUMMARY OF THE INVENTION

Accordingly, it is a general object of this invention to provide an apparatus having a first device operative to play a phonograph record and a second device operative to record on a record medium, such as a magnetic tape, the content of a phonograph record being played by the first device, and in which the above described disadvantages of the existing apparatus of that type are avoided.

More particularly, it is an object of this invention to provide an apparatus, as aforesaid, in which a halt in the operation of either one of the phonograph record player and recorder devices causes a halt in the operation of the other device.

Another object is to provide an apparatus, as aforesaid, in which the automatic halting of the operation of either one of the phonograph record player and recorder devices in response to a halt in the operation of the other device is effected in such a manner as to make readily apparent that such automatic halting of operation has occurred.

It is a further object of the invention to provide an apparatus, as aforesaid, in which a halt in the operation of the tape recorder device, for example, the automatic shut-off of the tape recorder device in response to the exhaustion of the tape supply therein, prior to the completion of the playing of a phonograph record results in merely the lifting of the tone arm of the phonograph record player device so as to disengage the pickup stylus from the phonograph record, whereby the lifted condition of the tone arm readily indicates that the playing of the record has not been completed, and further indicates the portion of the phonograph record that is still to be recorded on magnetic tape.

A still further object is to provide an apparatus, as aforesaid, in which the tape recorder device has at least a pause mode as well as a full-stop mode and a normal recording mode, and in which the tape recorder device is shifted from its normal recording mode to its pause mode to halt the operation thereof in the event that the playing of a phonograph record is completed prior to exhaustion of the supply of tape in the recorder device so that the occurrence of the foregoing circumstances may be readily noted from the pause mode of the tape recorder device.

Still another object of this invention is to provide an apparatus, as aforesaid, in which the content of the phonograph record being played by the phonograph record player device and simultaneously recorded by the tape recorder device can be conveniently edited, that is, in which only selected portions of the content of the played phonograph record are recorded in successive sections of the magnetic tape.

In accordance with an aspect of this invention, a combined phonograph record player and recorder comprises a first device operative to play a phonograph record, a second device operative to record on a record medium the content of a phonograph record being played by the first device, detecting means for detecting a halt in the operation of at least one of the first and second devices during the recording by the second device of the content of a phonograph record being played by the first device, and a control means for halting the operation of the other of the devices in response to the detection by the detecting means of a halt in the operation of said one device.

In a preferred embodiment of this invention, the phonograph record playing device includes a tone arm which is raised to lift the pickup stylus from a phonograph record being played either manually in response to actuation of a lift device, or automatically in response to the completion of the playing of the phonograph record or in response to a predetermined state of a first solenoid, with lifting of the tone arm being effective to actuate a respective switch, and the recording device is in the form of a magnetic tape recorder having a tape drive for driving the tape from a supply reel toward a take-up reel and rotating the latter for winding the tape thereon, with operation of the tape drive being halted either at will in response to actuation of a full-stop control or a pause control, or automatically in response to the exhaustion of the tape on the supply reel. In the preferred embodiment, a device is provided for detecting a halt in the operation of the tape drive and for extablishing the predetermined state of the first solenoid and thereby lifting the tone arm of the phonograph record player device in response to any halt in the operation of the tape drive, and a second solenoid is provided in association with the pause control of the tape recorder device and under the control of the previously mentioned switch so as to cause the pause control to halt the operation of the tape drive whenever such switch is actuated in response to lifting of the tone arm.

The above, and other objects, features and advantages of this invention will be apparent in the following detailed description of an illustrative embodiment thereof which is to be read in connection with the accompanying drawings.

DESCRIPTION OF THE PREFERRED EMBODIMENT

Figure 1:
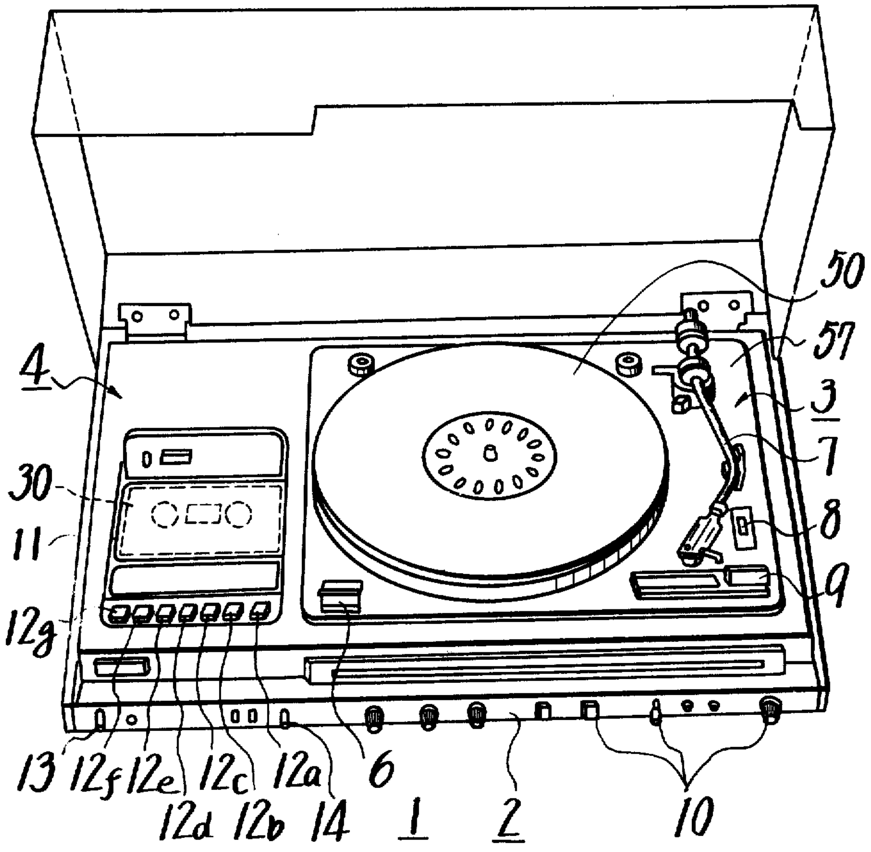
FIG. 1 is a perspective view illustrating a combined phonograph record player and recorder in accordance with an embodiment of this invention.

Referring initially to FIG. 1, it will be seen that an apparatus 1 according to this invention generally comprises a housing or casing 2 in which there are suitably mounted a first device 3 in the form of a phonograph record player and a second device 4 shown in the form of a cassette type tape recorder which may be made operative to reproduce signals recorded on the magnetic tape contained in a cassette 30 and/or to record signals on such tape, for example, to record the content of a phonograph record being simultaneously played by the phonograph record player 3. If desired, the portion of housing 2 in front of phonograph record player 3 may further contain a radio receiver which is suitably controlled by various knobs 10 extending from the front wall of housing 2.

Figure 3:
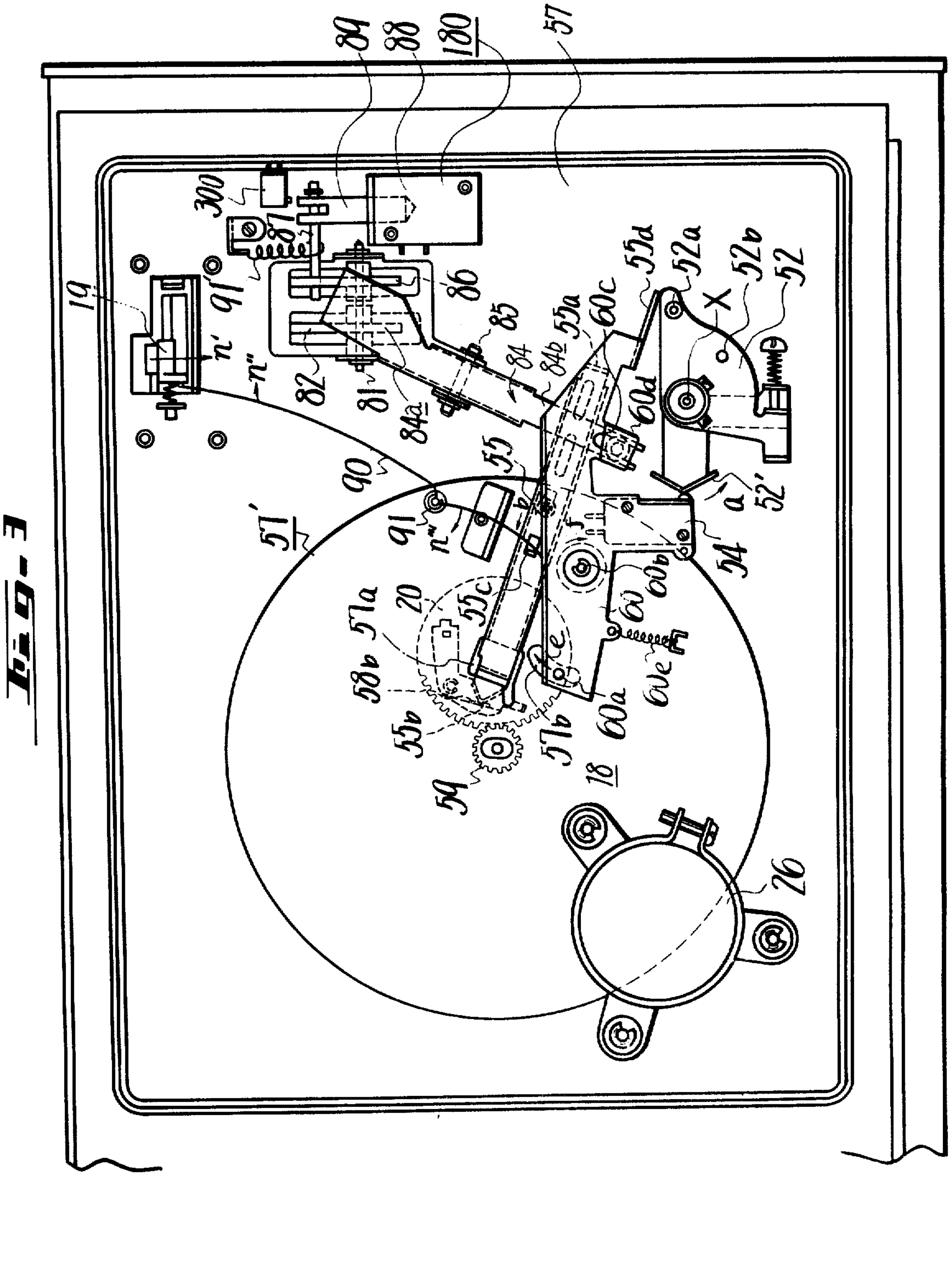
FIG. 3 is an enlarged bottom plan view of the phonograph record player.
Figure 4:
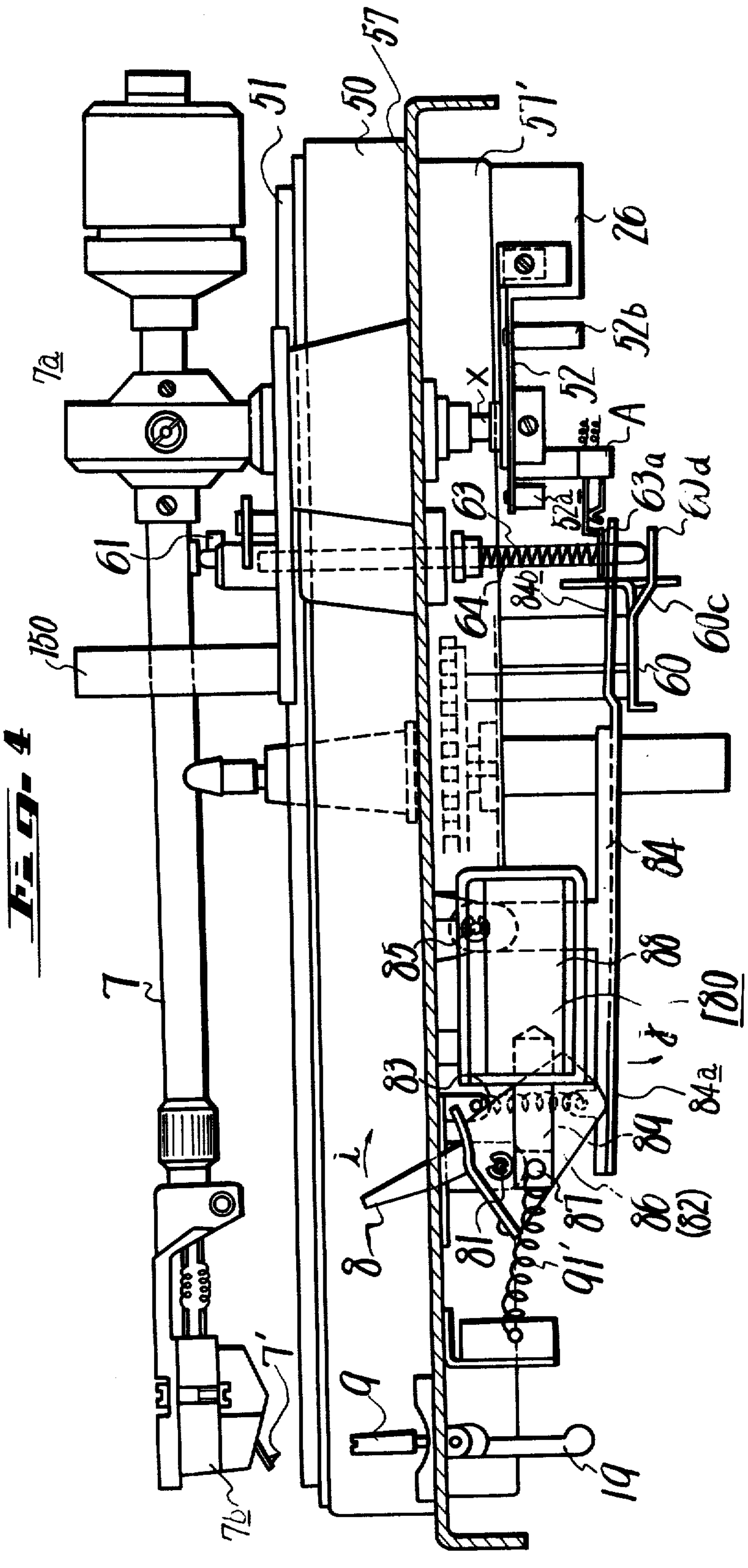
FIG. 4 is an enlarged sectional view taken along the line IV—IV on FIG. 2, and showing details of the arrangements provided for lifting the tone arm of the phonograph record player.

The phonograph record player 3 is shown to include a base plate 57 having a circular depression 57′ therein (FIG. 3) over which a turntable 50 is rotatably mounted for supporting a phonograph record 51 (FIG. 4). The phonograph record player 3 is further shown on FIG. 1 to generally include a turntable speed selector control lever 6, a tone arm 7, a cueing control lever 8 for manually lifting and lowering tone arm 7, and a control lever 9 for rejecting or aborting a record playing operation of the phonograph record player.

As further shown on FIG. 1, the tape recorder 4 has a recess 11 in its deck for receiving the tape cassette 30, and a series of push-buttons 12*a*-12*g* associated with conventional mechanisms for selecting various operating modes or states of tape recorder 4. Thus, push-button 12*a* may be depressed to select the pause state in which driving of the tape in recorder 4 is temporarily halted, push-button 12*b* may be depressed to select the recording operating mode, push-button 12*c* may be depressed to select the fast-forward operating mode in which the tape is rapidly transferred from the supply reel to the take-up reel within cassette 30, push-button 12*d* may be depressed to select the normal-forward operating mode in which the tape is relatively slowly transferred from the supply reel to the take-up reel during a reproducing operation or during a recording operation if push-button 12*b* is simultaneously depressed with push-button 12*d*, push-button 12*e* may be depressed to select the full-stop state of recorder 4 in which the driving of the tape is halted and can be again initiated only by depressing push-button 12*c* or push-button 12*d*, push-button 12*f* may be depressed to select the rewind operating mode in which the tape is rapidly transferred from the take-up reel back to the supply reel, and push-button 12*g* may be depressed for ejecting the cassette 30 from recess 11. Further, the apparatus 1, as shown, may be provided with a control 13 for a power switch by which the various circuits of the apparatus are connected with a source of power, and with a control 14 which, in one state, permits the independent operation of phonograph record player 3 and tape recorder 4 and, in another state, interlocks or establishes inter-dependency between the operations of phonograph record player 3 and tape recorder 4, as hereinafter described in detail.

Figure 2:
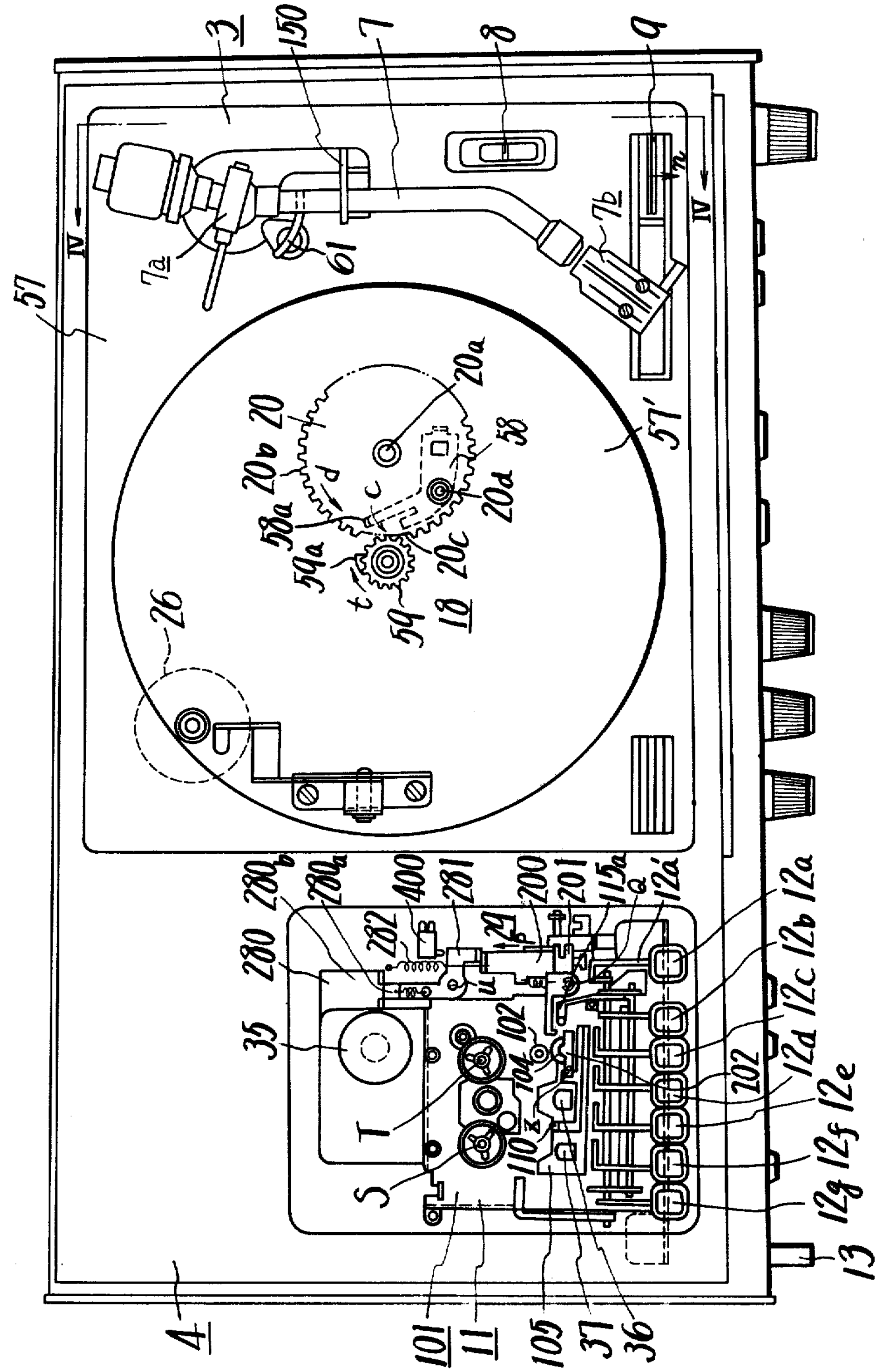
FIG. 2 is a schematic plan view of the apparatus shown in FIG. 1, but with the turntable of the phonograph record player and the cover plate or top deck of the tape recorder being removed.

Referring now to FIGS. 2, 3 and 4, it will be seen that tone arm 7 is conventionally mounted adjacent one end, as by a gimbal 7*a*, on a vertical rotatable shaft X supported in bearings carried by base plate or frame 57 so that the tone arm 7 carrying a conventional pickup 7*b* with a stylus 7′ at its free end is capable of lateral swinging movement across turntable 50 and also capable of being raised and lowered relative to the turntable.

Thus, tone arm 7 is capable of movement between an elevated rest position on an arm rest 150 outside the perimeter of turntable 50 (FIGS. 2 and 4) and an inner position (not shown) which corresponds to the engagement of pickup stylus 7′ in the conventional final non-recorded groove portion of the record 51 on turntable 50. A rotary plate assembly 52 is mounted on shaft X below base plate 57 (FIGS. 3 and 4) so as to turn with tone arm 7 about the axis of shaft X and includes a switch actuator 52′ (FIG. 3) which, in the rest position of tone arm 7 is engageable with a switch 54 so as to open the contacts of the latter. The switch 54 is interposed in a suitable circuit (not shown) through which a motor 26 is energizable to drive turntable 50 by way of a suitable transmission (not shown) only when switch actuator 52′ is disengaged from switch 54.

In order to initiate the operation of phonograph record player 3 for playing a record 51 disposed on turntable 50, tone arm 7 is manually removed from its rest position on arm rest 150 and is turned with shaft X about the axis of the latter and lowered so as to engage pickup stylus 7′ in a selected portion of the record groove on phonograph record 51, for example, in the outermost turn of the spiral record groove. Such movement of tone arm 7 disengages switch actuator 52′ from switch 54 to cause energizing of motor 26 and rotation of turntable 50. Thereafter, the playing of the phonograph record is continued with the tone arm 7 swinging progressively inward across the record 51 by reason of the tracking of stylus 7′ in the spiral record groove.

The illustrated phonograph record player 3 is provided with an automatic stop mechanism 18 (FIGS. 2 and 3) which is effective to stop the playing of the phonograph record 51 and to return tone arm 7 to its rest position either when the playing of the phonograph record has been completed, that is, when tone arm 7 reaches the inner position corresponding to the engagement of stylus 7′ in the final non-recorded groove portion of the record, or when reject control lever 9 is manually actuated.

The automatic stop mechanism 18 is shown to include a pin 52*a* depending from rotary plate assembly 52 and being engageable, when plate assembly 52 turns in the direction of the arrow *a* on FIG. 3 to a position (not shown) corresponding to the previously mentioned inner position of tone arm 7, against an end portion 55*a* of a longitudinally movable slide 55 which is slidably mounted under base plate 57 and is movable in the direction of the arrow *b* on FIG. 3 when actuated by pin 52*a*. The opposite end portion of slide 55 is bent upwardly so as to extend through an aperture 57*a* in the depression 57′ of the base plate and extends adjacent the axis of rotation of turntable 50. The end portion of slide 55 which extends through aperture 57*a* has a pointed end 55*b* (FIG. 3) which is located under a control gear 20 rotatably mounted within depression 57′ on a shaft 20*a*. The control gear 20 is shown to have peripheral teeth 20*b* with a gap or recess 20 *c* which, in the initial position of control gear 20 (FIG. 2), faces toward a pinion 59 fixed on the shaft of turntable 50 for rotation with the latter. It will be apparent that, in the initial position of control gear 20, pinion 59 can rotate with the turntable independently of control gear 20. In order to initiate rotation of control gear 20, a clutch member 58 is pivotally mounted under gear 20 on a pin 20*d* carried by the latter. The clutch member 58 includes an end portion 58*a* located adjacent gap 20*c* and which, in the illustrated inoperative position of clutch member 58 is outside the orbit of a claw member 59*a* which rotates with pinion 59 in the direction of the arrow *t* on FIG. 2. Clutch member 58 further has a downwardly directed projection 58*b* (FIG. 3) engageable by the pointed end 55*b* of slide 55 so that, when slide 55 is displaced in the direction of the arrow *b*, clutch member 58 is turned in the direction of the arrow *c* on FIG. 2 to an operative position in which its end portion 58*a* is engageable by the rotated claw member 59*a* to initiate the rotation of control gear 20 in the direction of the arrow *d*. Such initial rotation of gear 20 brings its peripheral teeth 20*b* into meshing engagement with the teeth of rotated pinion 59, whereupon the rotation of gear 20 is continued through a complete revolution, that is, until gap 20*c* again returns to the position adjacent pinion 59.

The underside of control gear 20 has a cam groove (not shown) formed therein and being slidably engaged by a cam follower pin 60*a* (FIG. 3) which extends upwardly through a slot 57*b* in base plate 57 from one end of a control lever 60 which is pivoted, intermediate its ends, on a pin 60*b* depending from base plate 57. During the first half-revolution of control gear 20, cam follower pin 60*a* is moved in the direction of the arrow *e* on FIG. 3 so as to turn control lever 60 in the direction of the arrow *f* and, thereafter, during the second or final half-revolution of control gear 20 control lever 60 is turned in the opposite direction, that is, in the counter-clockwise direction as viewed on FIG. 3, so as to restore control lever 60 to its original position shown on FIG. 3 under the urging of a spring 60*e*.

As shown on FIGS. 3 and 4, the arm portion of control lever 60 opposite to the arm portion carrying cam follower pin 60*a* has a rearwardly directed extension 60*d* which is at a lower level than the remainder of lever 60 and is connected to the latter by an inclined ramp portion 60*c*. With control lever 60 in its initial or starting position (FIG. 3) its relatively low extension 60*d* extends under, and supports the lower end of a vertically movable lift rod 63 (FIG. 4) which extends slidably through a suitable bearing carried by base plate 57 and which is urged downwardly by a compression spring 64. An arcuate arm lifter 61 (FIGS. 2 and 4) extends under tone arm 7 in all positions of the latter and is mounted on the upper end of vertically movable lift rod 63 so as to move with the latter. When control lever 60 is in its original or starting position (FIG. 3) so that its relatively low extension 60*d* is disposed under rod 63, rod 63 and lifter 61 are in relatively low positions so that tone arm 7 can be lowered to engage pickup stylus 7′ with the phonograph record 51. However, in response to the initial turning of control lever 60 from its starting position in the direction of the arrow *f* on FIG. 3, inclined ramp 60*c* of control lever 60 moves under rod 63 so as to displace the latter upwardly and thereby raise arm lifter 61 against tone arm 7. Accordingly, arm lifter 61 raises tone arm 7 and pickup stylus 7' is lifted from the surface of phonograph record 51.

As control lever 60 is further turned in the direction of the arrow *f* on FIG. 3, an extension 55*d* on lever 60 engages with a pin 52*b* depending from rotary plate assembly 52 with the result that, during the final turning of lever 60 in the direction of the arrow *f*, rotary plate assembly 52, and hence shaft X and tone arm 7 are turned in the direction opposed to the arrow *a* on FIG. 3 for returning tone arm 7 to its rest position above arm rest 150. As shown on FIG. 4, a normally closed switch A is mounted under base plate 57 adjacent lift rod 63, and the latter has a flange 63*a* fixed thereon to actuate switch A and thereby open the contacts of the latter when lift rod 63 is raised by its engagement with the ramp 60*c* and the adjacent relatively high portion of control lever 60. Thus, normally closed switch A is open in response to the lifting of the pickup stylus 7' from the surface of phonograph record 51.

With tone arm 7 returned to a position above arm rest 150, rotary plate assembly 52 is restored to the position shown on FIG. 3 and, as previously mentioned, control lever 60 is turned counter to the arrow *f* and restored to its original illustrated position during the final or second half-revolution of control gear 20 so that, upon the completion of the full revolution of gear 20, switch 54 is again engaged by switch actuator 52' to cause deenergizing of motor 26. Further, upon the restoration of control lever 60 to its original illustrated position, the relatively low extension 60*d* of control lever 60 is again positioned under lift rod 63 so that spring 64 moves lift rod 63 and arm lifter 61 in the downward direction to permit the settling of tone arm 7 on arm rest 150. Accordingly, the automatic shut-off of phonograph record player 3 with its tone arm 7 returned to its rest position is completed.

In order to provide for the operation of the above described automatic shut-off mechanism 18 in response to actuation of the rejecting control lever 9 as well as in response to completion of the playing of a record, the phonograph record player 3 is further shown to have an arm 19 (FIGS. 3 and 4) pivotally mounted below base plate 57 and being connected with control lever 9 so as to move in the direction of the arrow *n'* on FIG. 3 in response to manual actuation of the related control lever 9. An elongated spring lever 90 (FIG. 3) is pivotally mounted intermediate its ends under base plate 57, as on a pivot pin 91, and has one of its ends suitably connected with arm 19, while its other end acts against a tab 55*c* which is struck from slide 55. When control lever 9 is actuated to move arm 19 in the direction of the arrow *n'*, the opposite end portions of spring 90 are moved in the direction of the arrows *n''* and *n'''*, respectively, on FIG. 3, with the result that spring 90 displaces slide 55 in the direction of the arrow *b* for again initiating the operation of automatic shut-off mechanism 18. Thus, upon manual actuation of control lever 9 for rejecting or aborting the operation of phonograph record player 3 prior to the completion of the playing of a record 51, tone arm 7 is immediately raised for lifting pickup stylus 7' from the surface of the record, switch A is actuated to its open condition and tone arm 7 is restored to its rest position with motor 26 then being rendered inoperative.

In order to provide for the manual lifting and lowering of tone arm 7 by the action of cuing control lever 8, the latter is shown to extend upwardly through a suitable slot in base plate 57 from a respective cam or eccentric 82 which is pivoted on a pin 81 mounted below base plate 57 (FIGS. 3 and 4). A lever 84 is rockable, intermediate its ends, on a pivot 85 mounted below base plate 57, and the forward end portion 84*a* extends under cam or eccentric 82 and is urged upwardly into engagement with cam 82 by means of a spring 83. The back end portion 84*b* of rockable lever 84 is bifurcated and embraces the lower end portion of lift rod 63 under flange 63*a*. Thus, when cuing control lever 8 is displaced in the direction of the arrow *i* on FIG. 4, the turning of the respective cam or eccentric 82 rocks lever 84 in the direction of the arrow *j* with the result that its back end portion 84*b* is raised to lift rod 63 and arm lifter 61, with the result that tone arm 7 is raised for lifting pickup stylus 7' from the surface of phonograph record 51 and switch A is acutated to its open condition. It will be apparent that the actuation of cuing control lever 8 merely raises tone arm 7 for interrupting the playing of the record and does not initiate the operation of previously described shut-off mechanism 18 for returning the tone arm to its rest position. While tone arm 7 is raised by arm lifter 61, the tone arm can be manually turned about the axis of shaft X so as to locate pickup stylus 7' above any desired portion of the record groove of phonograph record 51. When cuing control lever 8 is returned to the position shown on FIG. 4, spring 83 rocks lever 84 in the clockwise direction, as viewed on FIG. 4, with the result that back end portion 84*b* of lever 84 is lowered to permit the downward movement of rod 63 and arm lifter 61, whereby pickup stylus 7' is again engaged with the grooved surface of record 51. In accordance with the present invention, a second cam or eccentric 86 which has a shape similar to that of the cam 82 is pivotally mounted on the pin 81 in side-by-side relation to cam 82 so as to be turnable independently on the latter. The second cam 86 is also engageable with the forward end portion 84*a* of rockable lever 84, and a pin 87 on cam 86 connects the latter to the armature 89 of a solenoid 180 having a coil 88 within which armature 89 is longitudinally movable. When coil 88 solenoid 180 is energized, as hereinafter described in detail, core or armature 89 is retracted or drawn into coil 88 to dispose cam 86 in the position shown on FIG. 4 so that spring 83 can dispose rockable lever 84 with its back end portion 84*b* at its relatively low position. A spring 91' is connected at its opposite ends to pin 87 and to an achor depending from base plate 57 so that, when coil 88 of solenoid 180 is deenergized, spring 91' is effective to turn cam 86 in the clockwise direction from the position shown on FIG. 4, whereby to rock lever 84 in the direction of the arrow *j* for raising rod 63 and arm lifter 61 and thereby lifting tone arm 7 and actuating switch A to its open condition, as previously described.

From the foregoing, it will be apparent that switch A is actuated from its normal closed condition to its open condition whenever tone arm 7 is raised to removed pickup stylus 7' from engagement with record 51, whether such lifting of tone arm 7 is effected by the operation of automatic shut-off mechanism 18 at the completion of the playing of a record or in response to actuation of reject control lever 9, or by rocking of lever 84 in response to manual actuation of cuing control lever 8 or in response to deenergizing of solenoid 180.

Figure 5:
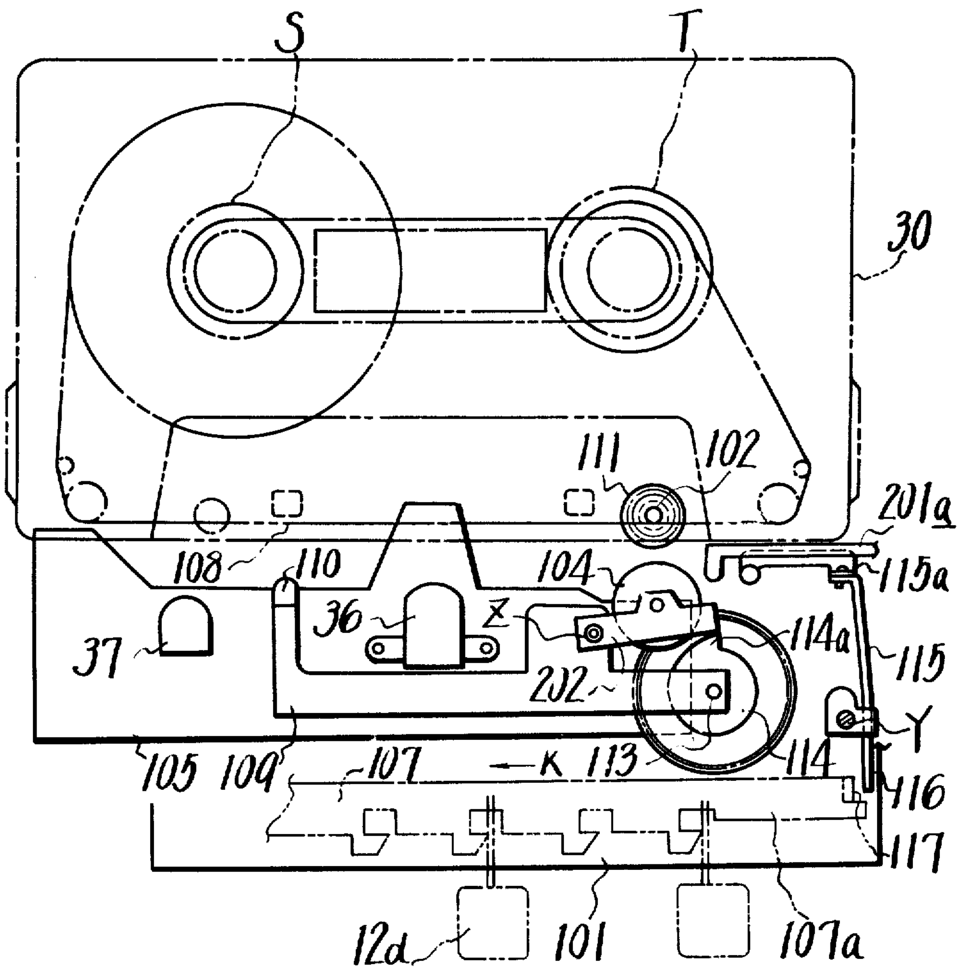
FIG. 5 is an enlarged, schematic plan view showing details of the tape recorder included in the apparatus of FIGS. 1 and 2, with such tape recorder being shown in its shut-off condition or state.
Figure 6:
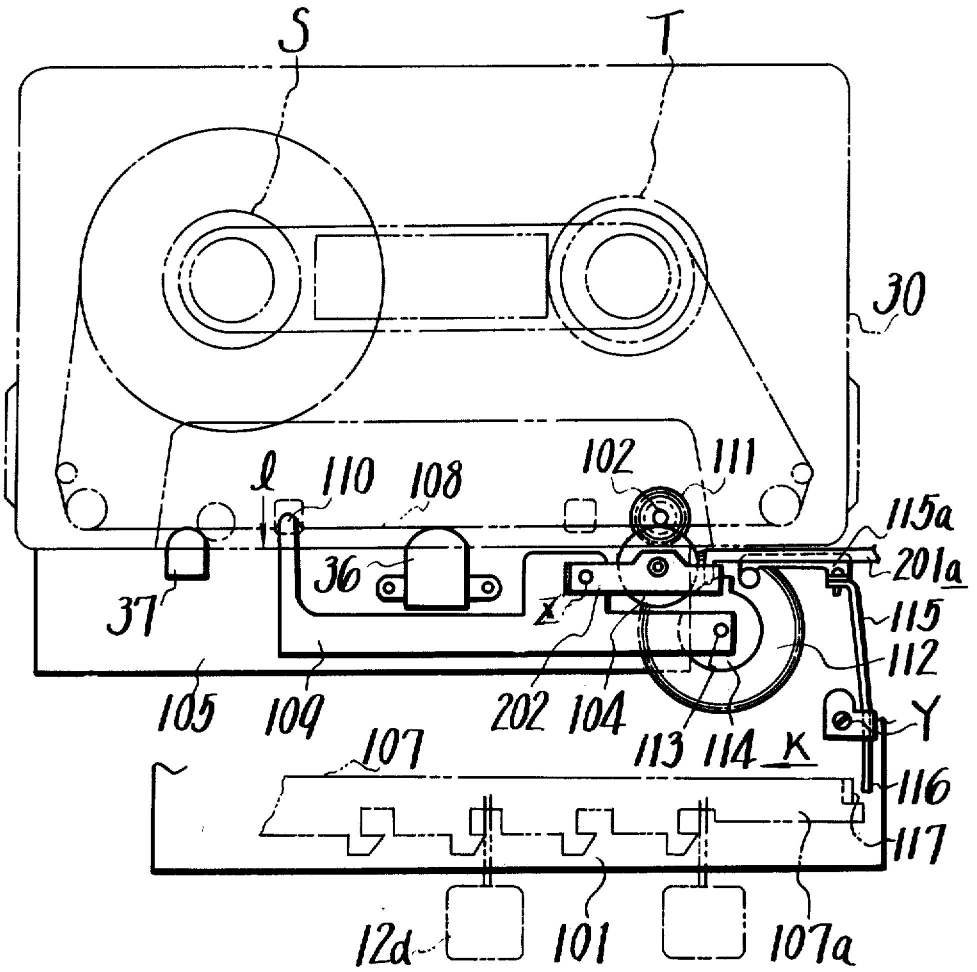
FIG. 6 is a view similar to that of FIG. 5, but showing the tape recorder in its normal tape-driving condition or state, as during the recording on the tape of the content of a phonograph record being played by the associated phonograph record player.

Referring now to FIGS. 2, 5 and 6, it will be seen that the tape recorder 4 included in the apparatus 1 according to this invention is shown to include a chassis 101 having supply and take-up reel drive shafts S and T rotatably mounted thereabove for rotatable coupling with the supply and take-up reels, respectively, of the cassette 30 when the latter is installed in recess 11. A motor 35 on chassis 101 (FIG. 2) is effective, when energized, to drive a capstan 102, as through a belt and pulley transmission (not shown), and the tape recorder 4 is further provided with conventional transmission assemblies by which reel drive shafts S and T are suitably driven in correspondence with the selected operating mode established by depressing either the normal-forward push-button 12*d*, the fast-forward push-button 12*c*, or the rewind push-button 12*f*. Further, as is conventional in tape recorders, the transmission assemblies for rotating reel drive shafts S and T in the normal-forward, fast-forward and rewind operating modes, respectively, are all rendered inoperative in response to actuation of the full-stop push-button 12*e*, with the previously actuated push-button 12*c*, 12*d* or 12*f* being returned to its inactive position. On the other hand, the actuation of the pause push-button 12*a* merely temporarily halts the transmission of rotary movement to the reel drive shaft T or S without restoring a previously actuated operating mode selecting push-button to its inactive position.

The illustrated tape recorder 4 is further shown to include the usual carriage 105 which is slidably mounted on chassis 101 so as to be movable between an inactive position (FIG. 5) and an operative position (FIG. 6). Carriage 105 is conventionally moved to its operative position (FIG. 6) in response to the actuation of push-button 12*d* for selecting the normal-forward operating mode of the tape recorder in which signals are to be recorded on, or reproduced from the tape 108 contained in cassette 30. Carriage 105 carries a recording and/or reproducing magnetic head 36 and an erasing head 37 which, in the operative position of carriage 105 (FIG. 6), project through suitable windows in a side of cassette 30 for engagement with a run of the tape 108 which extends along that side of the cassette past the rotated capstan 102. Carriage 105 further carries an arm 202 pivoted on a pin Z and rotatably supported a pinch roller 104 which, in the operative position of carriage 105 (FIG. 6), is urged against capstan 102 with the tape 108 therebetween, for example, by a suitable spring (not shown) acting on arm 202.

In order to lock any selected one of the push-buttons 12*b*, 12*c*, 12*d* and 12*f* in its depressed or actuated position, tape recorder 4 is shown to include a conventional locking member 107 (FIGS. 5 and 6) which is yieldably urged toward the right so as to engage a respective one of its locking noses 107' with the push-button which has been depressed until such time as locking member 107 is displaced in the direction of the arrow K so as to release the previously depressed push-button, for example, in response to actuation of the full-stop push-button or any other of the operating mode selecting push-buttons.

The illustrated tape recorder 4 is further shown to be provided with an automatic stop mechanism for halting the driving of the tape 108, that is, for halting the rotation of reel drive shafts S and T, in response to the complete unwinding of the tape from supply reel S in the normal-forward operating mode of the tape recorder. Such automatic stop mechanism is shown to include a lever 109 pivotally mounted intermediate its ends on the pin Z carried by slidable carriage 105 and having an extension 110 at one end which, in the operative position of carriage 105 (FIG. 6), is engageable with the tape 108 within cassette 30 for deflecting the tape from a straight path. The opposite end of lever 109 carries a shaft 113 on which a gear 112 is rotatable and, in the normal position of lever 109 shown on FIG. 6, the periphery of gear 112 is adjacent to, but spaced from a gear 111 which is rotatable with capstan 102. An actuating member 114 which may be in the form of a spiral cam having a radial face 14*a* is either integral with gear 112 or otherwise rotatable therewith and is adapted, in response to rotation of gear 112, to effect actuation of a shut-off member 115. Such shut-off member 115 is shown to be pivoted, as at Y, on chassis 101 and to have an end portion 116 disposed adjacent an abutment 117 on the respective end portion 107*a* of locking member 107. The opposite end portion of pivoted shut-off member 115 has a right-angled extension 115*a* which, when carriage 105 is in its operative position, extends into the path of the radial face or shoulder 114*a* on the rotary actuating member 114. It will be apparent that, when gear 112 and actuating member 114 are rotated in the clockwise direction from the position shown on FIG. 6, radial shoulder 114*a* acts on extension 115*a* to cause clockwise pivoting of shut-off member 115 with the result that end 116 of the latter acts against abutment 117 to displace locking member 107 in the direction of the arrow K and thereby release the previously depressed push-button 12*d* for removing the tape recorder from its normal-forward operating mode, that is, for halting the rotation of take-up reel drive shaft T and for returning carriage 105 to its inoperative position.

The foregoing operation of the automatic shut-off mechanism occurs when, in the normal-forward operation mode of the tape recorder, all of the tape is unwound from the supply reel and wound onto the take-up reel in cassette 30, with the result that further driving of the tape by capstan 102 is resisted to increase the tension in the tape between the capstan and the supply reel. Such increased tape tension acts on extension 110 of lever 109 to urge the extension 110 in the direction of the arrow *l* on FIG. 6, and thereby to turn lever 109 in the counter-clockwise direction about pivot Z. The turning of lever 109 brings gear 112 into meshing engagement with the gear 111 rotated with capstan 102, and thus gear 112 is rotated in the clockwise direction for causing actuating member 114 to pivot shut-off member 115, as previously described. It will be apparent that, in the case where the automatic shut-off mechanism is operated to halt the tape drive in response to the full unwinding of the tape from the supply reel, such fact is thereafter evident from the disposition of all of the push-buttons 12*a*-12*g* in their inactive positions.

Figure 9:
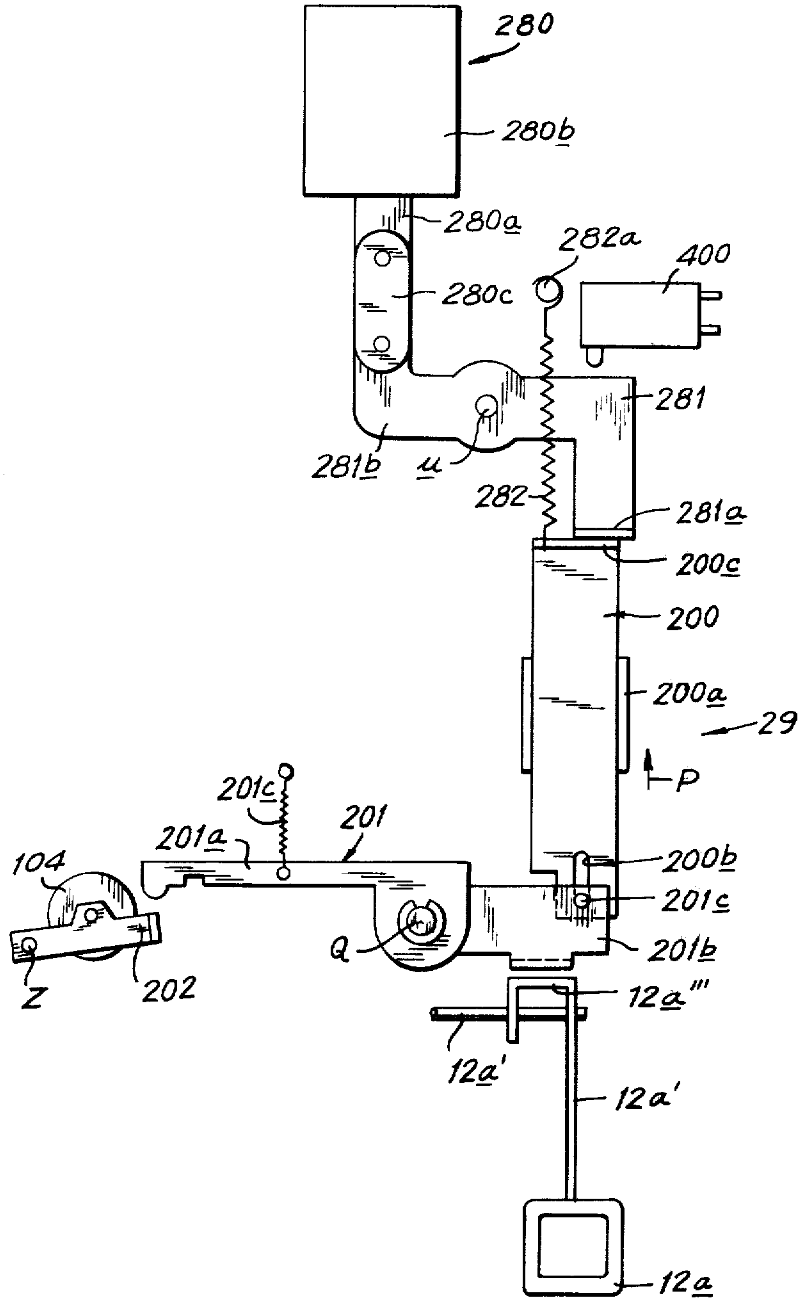
FIG. 9 is an enlarged detail plan view showing an arrangement provided in accordance with the invention for automatically actuating the pause control of the tape recorder in response to a halt in the playing of a record by the associated phonograph record player.

Referring now to FIGS. 2 and 9, it will be seen that push-button 12*a* mounted on a lever 12*a'* pivoted on a shaft 12*a''* is effective, when depressed, to actuate a conventional pause control mechanism. Such pause control mechanism is shown to include a lever 201 mounted intermediate its ends on a shaft Q and having opposed arms 201*a* and 201*b*. The lever arm 201*a* extends adjacent to the free end of arm 202 carrying a pinch roller 104, and the lever arm 201*b* extends adjacent to a portion 12*a*''' of lever 12*a*' which is disposed below the axis of shaft 12*a*''. Thus, when tape recorder 4 is in its normal-forward operating mode, that is, when push-button 12*d* is locked in its depressed or operative position, the actuation or depressing of push-button 12*a* effects rearward movement of lever portion 12*a*''' against lever arm 201*b* for pivoting lever 201 in the counter-clockwise direction, as viewed on FIG. 9. Such pivoting of lever 201 causes arm 201*a* thereof to act against pinch roller support arm 202 in the direction separating pinch roller 104 from capstan 102 even though carriage 105 remains in its operative position by reason of the fact that the actuation of pushbutton 12*a* does not effect release of locking member 107. As is conventional, the pause control mechanism further includes an arrangement (not shown) by which the transmission of rotational movement to the take-up reel driveshaft T is halted, for example, by the disengagement of a suitable clutch, so long as lever 201 is pivoted, as described above, to separate pinch roller 104 from capstan 102. Thus, the driving of the tape 108 is halted in response to actuation or depressing of push-button 12*a*. Of course, upon the removal of the manually applied pressure from push-button 12*a*, lever 201 is returned in the clockwise direction to its original position, as by a spring 201*c* (FIG. 9), so that pinch roller 104 again engages capstan 102 and the driving of take-up drive-shaft T is again initiated to continue the operation of tape recorder 4 in its normal-forward operating mode.

In accordance with this invention, the apparatus 1 is further provided with a control mechanism 29 (FIG. 9) by which the above described pause control mechanism is operated to halt the driving of tape 108 independently of the actuation of push-button 12*a* whenever tone arm 7 of phonograph record player 3 is lifted, that is, whenever switch A is actuated to its open condition. The mechanism 29 is shown to include a slide 200 which is longitudinally movable, as in guides 200*a* on chanssis 101, and which is connected at one end to lever arm 201*b*, as by a pin 201*c* on lever arm 201*b* engaging slidably in an elongated slot 200*b* provided in the adjacent end portion of slide 200. A spring 282 is connected between slide 200 and an anchor 282*a* on the chassis for urging slide 200 to move in the direction of the arrow P, and thereby causing lever 201 to turn in the counter-clockwise direction against the force of spring 201*c*. Thus, when slide 200 is free to be moved by spring 282 in the direction of the arrow P from the position shown in FIG. 9, the pause control mechanism is operated to halt the driving of tape 108 as if push-button 12*a* had been actuated. The mechanism 29 is further shown to include a generally S-shaped lever 281 which is pivoted intermediate its ends on a pin *u* carried by chassis 101 and located so that one end 281*a* of lever 281 confronts a flange 200*c* on the end of slide 200 remote from lever arm 201*b*. The other end 281*b* of lever 281 is connected, as by a pivoted link 280*c*, with the core or armature 280*a* of a solenoid 280 having a coil 280*b* in which armature 280*a* is longitudinally movable. Solenoid 280 is arranged so that armature 280*a* is retracted, as shown on FIG. 9, when coil 280*b* is energized, and the core or armature 280*a* is free to be extended out of coil 280*b* upon deenergizing of the latter. When armature 280*a* is held in its retracted condition by energizing of coil 280*b*, lever 281 is retained in the position shown on FIG. 9, in which the end 281*a* of lever 281 abuts flange 200*c* on slide 200 for blocking the movement of the slide by spring 282 in the direction of the arrow P. Thus, when solenoid 280 is energized, the pause control mechanism is actuable by push-button 12*a*, that is, lever 201 can be pivoted in response to actuation of push-button 12*a* with pin 201*c* moving in slot 200*b* of slide 200 which is held against movement in the direction of the arrow P. However, when solenoid 280 is deenergized, spring 282 is effective to move slide 200 in the direction of the arrow P with lever 281 being pivoted in the counterclockwise direction from the position shown on FIG. 9.

As will be hereinafter described in detail, the energizing of solenoid 280 is controlled by the switch A which detects the lifting of tone arm 7 of phonograph record player 3. More specifically, coil 280*b* of solenoid 280 is energized when switch A is in its closed position, that is, when tone arm 7 is lowered to engage pickup stylus 7' with record 51, whereas the lifting of tone arm 7 for removing stylus 7' from the phonograph record causes actuation of switch A to its open condition so as to deenergize solenoid coil 280*b*, with the result that mechanism 29 operates the pause control mechanism for halting the feeding of the tape 108 so long as switch A remains in its open condition, that is, detects that tone arm 7 is lifted to halt the record playing operation of phonograph record player 3.

Figure 7:
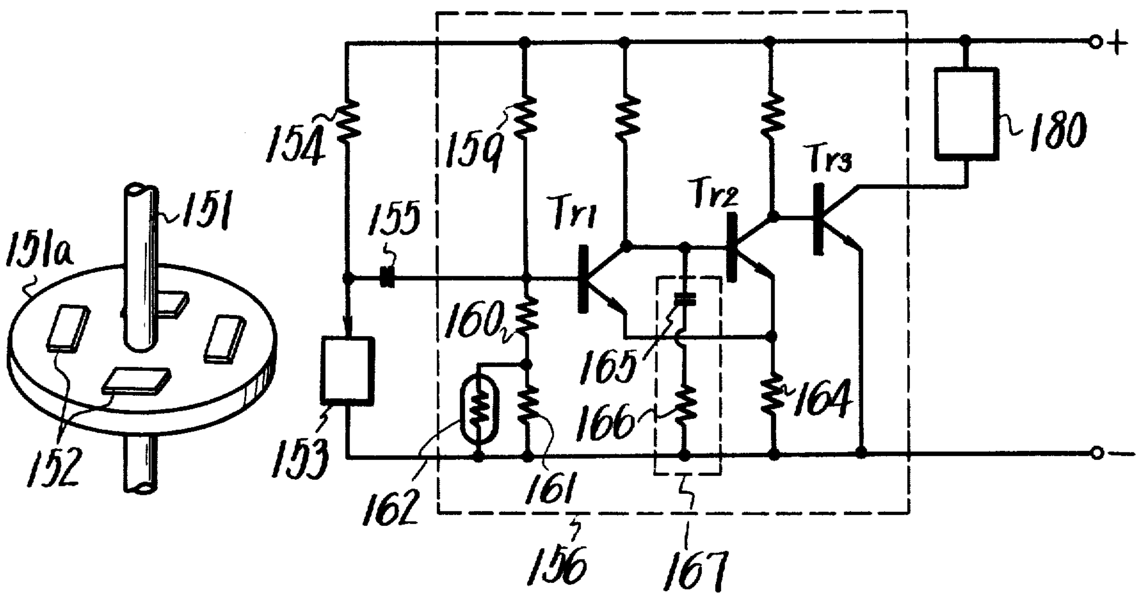
FIG. 7 is a schematic circuit diagram of an arrangement provided in the combined phonograph record player and recorder according to this invention for detecting a halt in the operation of the tape drive of the recorder.

In accordance with the present invention, the apparatus 1 further comprises an arrangement for detecting a halt in the recording operation of tape recorder 4, that is, a halt in the driving of the tape 108, and for deenergizing solenoid 180 so that tone arm 7 is thereby lifted in response to the detection of a halt in the recording operation of tape recorder 4. More specifically, as shown on FIG. 7, the shaft 151 of the take-up reel drive T is provided with a disc 151*a* having one or more magnets 152, for example, four equally spaced magnets, thereon, and a magneto-sensitive element 153 which, for example, varies its resistance in response to variations in the strength of a magnetic field acting thereon, is suitably mounted adjacent the periphery of disc 151*a*. The magneto-sensitive element 153 is inserted, in series with a bias resistor 154, between power source terminals + and −, and the connection point between element 153 and resistor 154 is connected through a capacitor 155 to a switching circuit 156 which controls the energizing of solenoid 180. In the illustrated embodiment, switching circuit 156 is shown to include a Schmitt circuit consisting of transistors Tr1 and Tr2, and a reversing transistor Tr3. The emitter electrodes of transistors Tr1 and Tr2 are interconnected and connected to the power source terminal − or ground through a common resistor 164. The base electrode of transistor Tr1 is connected to capacitor 155 and, through a bias resistor 159, to the power source terminal +. The base electrode of transistor Tr1 is further connected through resistors 160 and 161, in series, to the other power source terminal −, and a thermistor 162 is connected in parallel with resistor 161 for providing temperature compensation. The collector electrodes of transistors Tr1 and Tr2 are connected to the power source terminal + through respective load resistors, and the collector electrodes of transistors Tr1 and Tr2 are further connected to the base electrodes of transistors Tr2 and Tr3, respectively. The coil of solenoid 180 is connected in series with the collector-emitter path of transistor Tr3 between the power source terminals + and −, so that solenoid 180 is energized only when transistor Tr3 is in its conductive state.

In the normal condition of switching circuit 156, input transistor Tr1 is non-conductive, output transistor Tr2 is conductive, and reversing transistor Tr3 is non-conductive. However, when shaft 151 is rotated during the driving of tape 108 in tape recorder 4, the magnets 152 on disc 151*a* repeatedly pass magnetosensitive element 153 so that the resistance value of the latter is repeatedly changed to produce a pulsing or AC voltage at the connection point between element 153 and resistor 154. Such pulsing or AC voltage is fed through capacitor 155 to the input of switching circuit 156. In order that the pulsing or AC voltage fed to the input of switching circuit 156 in response to driving of tape 108 will continuously hold reversing transistor Tr3 in its conductive state, and thereby cause continuous energizing of solenoid 180, a time constant circuit 167 is provided either within switching circuit 156, as shown, or connected to the input of the switching circuit. In the illustrated embodiment, time constant circuit 167 is constituted by a capacitor 165 and a resistor 166, in series, between the connection of the collector electrode of transistor Tr1 with the base electrode of transistor Tr2 and the power source terminal − or ground. Thus, although the signal fed to input transistor Tr1 is a pulsing or AC signal so that transistor Tr1 is repeatedly changed between its conductive and non-conductive states, the time constant circuit 167 provides that transistor Tr2 is made continuously non-conductive and reversing transistor Tr3 is made continuously conductive during the existence of the pulsing or AC signal. Accordingly, the coil 88 of solenoid 180 is continuously energized so as to retract the core or armature 89 so long as the tape is being driven in tape recorder 3.

Conversely, when the rotation of shaft 151 is stopped, that is, when the driving of tape 108 in tape recorder 4 is halted, no pulsing or AC signal is fed to the input of switching circuit 156, with the result that transistor Tr1 remains in its normal non-conductive state, whereby transistor Tr3 is also returned to its normal non-conductive state and the coil 88 of solenoid 180 is deenergized. As previously described, in response to such deenergizing of solenoid 180, its armature 89 is made to project or extend from coil 88 for actuating cam or eccentric 86 (FIG. 4) and thereby rocking lever 84 so as to lift tone arm 7 and separate stylus 7' from phonograph record 51.

Figure 8:
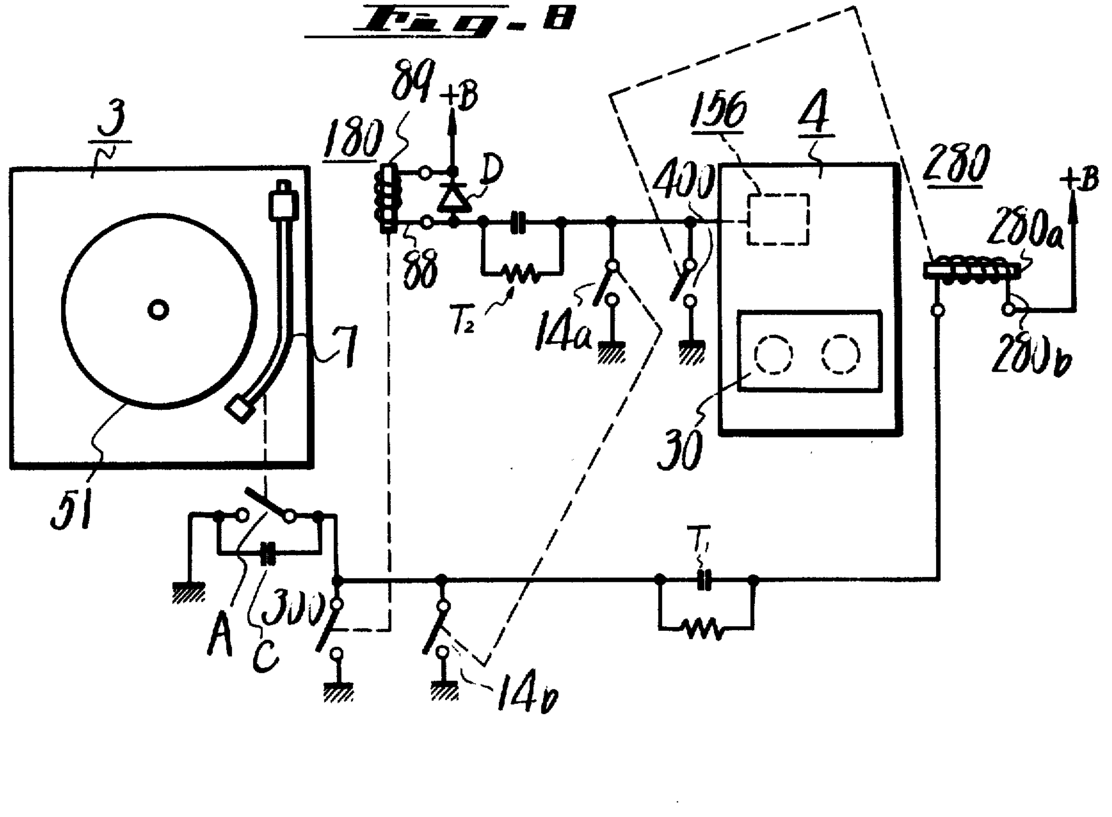
FIG. 8 is a schematic circuit diagram of the interdependent controls provided for the phonograph record player and recorder in the apparatus according to this invention.

Referring now to FIG. 8, it will be seen that, in the circuits for controlling the joint operation of phonograph record player 3 and tape recorder 4 in the apparatus 1 according to this invention, the coil 280*b* of solenoid 280 is connected between a power source terminal +B and ground through a time delay $T_1$ and switch A, in series, with a capacitor C being shown connected in parallel with switch A to avoid arcing and consequent noise upon opening and closing of switch S. A normally open microswitch 300 is connected in parallel with switch A to ground and, as shown on FIG. 3, microswitch 300 may be mounted at the underside of base plate 57 adjacent armature 89 of solenoid 180 so that, when coil 88 is deenergized to permit spring 91' to move armature 89 out of coil 89, armature 89 actuates switch 300 to its closed condition. Returning to FIG. 8, it will be seen that the coil 88 of solenoid 180 is connected between power source terminal +B and ground through a time delay circuit $T_2$ and the previously described switching circuit 156, in series, with a diode D being shown connected across coil 88 so as to prevent the back flow of current therethrough. A normally open microswitch 400 is connected in parallel with switching circuit 156 to ground and, as shown particularly on FIG. 9, microswitch 400 may be mounted on chassis 101 of tape recorder 4 adjacent lever 281 so that, when coil 280*b* of solenoid 280 is deenergized, the resulting pivoting of lever 281 in the counterclockwise direction from the position shown on FIG. 9 causes lever 281 to actuate switch 400 to its closed condition. The control circuits shown on FIG. 8 are completed by ganged switches 14*a* and 14*b* connected to ground in parallel with microswitches 400 and 300, respectively. The ganged switches 14*a* and 14*b* are operable by the previously mentioned control 14 so that, in the state of the latter for permitting independent operation of phonograph record player 3 and tape recorder 4, switches 14*a* and 14*b* are both closed and, in the state of control 14 for establishing inter-dependency between the operations of record player 3 and tape recorder 4, switches 14*a* and 14*b* are open, as shown on FIG. 8. Of course, when control 14 is in the state for obtaining interdependent operation of record player 3 and tape recorder 4, it further controls suitable conventional circuits by which the electrical output of pickup 7*b* of record player 3 is supplied, with suitable amplification, to magnetic head 36 of tape recorder 4 as the signal to be recorded on tape 108.

INTERDEPENDENT OPERATION OF PHONOGRAPH RECORD PLAYER 3 AND TAPE RECORDER 4

When the content of phonograph record 51 on turntable 50 of phonograph record player 3 is to be recorded on magnetic tape 108 in tape recorder 4, control 13 (FIG. 1) is actuated to close the respective switch by which power is supplied to the terminals +B on FIG. 8, and control 14 is actuated for opening switches 14*a* and 14*b*, as shown. After the cassette 30 is located in recess 11 of tape recorder 4, push-buttons 12*b* and 12*d* are simultaneously depressed to select the normal-forward operating mode and recording state of tape recorder 4. Since switches 300 and 400 are closed when solenoids 180 and 280, respectively, are deenergized, the initial energizing of solenoids 180 and 280 upon actuation of control 13 for closing the power supply switch occurs by way of the initially closed switches 400 and 300, respectively. Thereafter, as tape 108 is driven in the normal-forward operating mode of tape recorder 4, solenoid 180 continues to be energized through switching circuit 156 which detects the driving of tape 108, and tone arm 7 is manually removed from its rest position and disposed to engage stylus 7' with a desired portion of the record groove of phonograph record 51 so that switch A is closed to continue the energization of solenoid 280. Thus, solenoids 180 and 280 continue to be energized even though switches 300 and 400 return to their normal open conditions in response to the energizing of solenoids 180 and 280, respectively.

If during the recording of the content of phonograph record 51 on tape 108 the supply of the latter on the supply reel in cassette 30 is exhausted prior to the completion of the playing of record 51 by record player 3, the resulting increased tension in tape 108 is detected by member 110 so as to stop the driving of the tape, as previously described. The halt in the driving of the tape and the consequent halt in the rotation of take-up reel driveshaft 151 is detected by magnetosensitive element 153, with the result that switching circuit 156 causes deenergizing of solenoid 180. As previously described, the deenergizing of solenoid 180 causes lifting of tone arm 7 for removing stylus 7' from phonograph record 51 at the position above the record 51 corresponding to the point at which the supply of tape 108 was exhausted. Thereafter, a new tape cassette can be installed in tape recorder 4 and, upon the renewed actuation of push-buttons 12*b* and 12*d* for restoring the tape recorder to its recording state, the driving of the tape occurs again with the result that solenoid 180 is again energized through switching circuit 156. The energizing of solenoid 180 returns the associated cam or eccentric 86 to the position shown on FIG. 4, with the result that tone arm 7 is lowered to again engage stylus 7' with record 51 at the location where the playing of such record was interrupted in response to the exhaustion of the recording tape.

Of course, during the recording on tape 108 of the content of phonograph record 51, the actuation of either the pause pushbutton 12*a* or the full stop pushbutton 12*e* of tape recorder 4 serves to halt the driving of the tape and consequently halts the rotation of shaft 151. As before, the halt in the rotation of shaft 151 is detected by magneto-sensitive element 153 and, as a result of such detection, switching circuit 156 causes deenergizing of solenoid 180. Once again, deenergizing of solenoid 180 results in lifting of tone arm 7 for removing stylus 7' from the surface of phonograph record 51 and thereby interrupting the record playing operation. If the halt in the driving of tape 108 has been achieved by actuation of pause push-button 12*a*, the release of that push-button returns tape recorder 4 to its recording state, that is, restores the driving of tape 108, as a result thereof switching circuit 156 again effects energizing of solenoid 180 so that tone arm 7 is lowered to commence the record playing operation at the point on record 51 where it was discontinued or interrupted. If the halt in the driving of tape 108 was effected by the actuation of full stop push-button 12*e*, then push-buttons 12*b* and 12*d* have to be actuated again for returning tape recorder 4 to its recording state, in which state, tape 108 is again driven and switching circuit 156 causes energizing of solenoid 180 for lowering tone arm 7 and commencing the previously interrupted playing of record 51.

If the playing of phonograph record 51 is completed prior to the exhaustion of the supply of tape 108 on the supply reel in cassette 30, the engagement of stylus 7' with the final non-recorded groove portion of record 51 causes the automatic shut-off mechanism 18 of phonograph record player 3 to lift tone arm 7 and to return the latter to its rest position, as previously described in detail. Such lifting of tone arm 7 causes actuation of the normally closed switch A to its open condition with the result that coil 280*b* of solenoid 280 is deenergized. As previously described, the deenergizing of solenoid 280 permits spring 282 to displace slide 200 from the position shown on FIG. 9, and thereby causes actuation of the pause control mechanism for halting the driving of tape 108. Thereafter, the phonograph record on turntable 50 can be replaced and the playing of the new record initiated by the manual movement of tone arm from its rest position to a position where stylus 7' engages the surface of the new record. The restarting of the record playing operation of record player 3 results in closing of switch A with the result that solenoid 280 is again energized and the pause control mechanism of tape recorder 4 is restored to its inoperative position. Thus, the recording operation of tape recorder 4 is again initiated to further record on tape 108 the content of the new record being played by phonograph record 3.

At any time during the playing of a record 51 by phonograph record player 3, cuing control lever 8 or reject control lever 9 may be actuated with the result that tone arm 7 is lifted for removing stylus 7' from the phonograph record and for actuating switch A to its open condition. As before, the actuation of switch A to its open condition causes deenergizing of solenoid 280 with the result that tape recorder 4 is placed in its pause state. If the interruption of the record playing operation has been obtained by the actuation of cuing control lever 8, the return of that lever 8 to its original position for lowering tone arm 7 restores switch A to its normal closed condition, and solenoid 280 is again energized for returning tape recorder 4 to its recording state. It will be apparent that, when the record playing operation is interrupted by actuation of cuing control lever 8, as described above, stylus 7' can be returned to record 51 either at the point thereon where the record playing was interrupted, or at any other desired point, from which it follows that the content of record 51 as recorded on tape 108 may be edited, as desired.

If the interruption of the record playing operation has been effected by actuation of the reject control lever 9, in which case the tone arm 7 is both lifted from the record 51 and returned to its rest position, as described above, then the renewal of the record playing and recording operations can be achieved by manually removing tone arm 7 from its rest position and placing stylus 7' in contact with record 51 at any desired location on the latter.

INDEPENDENT OPERATION OF PHONOGRAPH RECORD PLAYER 3 AND TAPE RECORDER 4

When control 14 is disposed in its state for independent operations of phonograph record player 3 and tape recorder 4, switches 14*a* and 14*b* are closed, with the result that solenoids 180 and 280 are respectively permanently energized through such closed switches 14*a* and 14*b*. Thereafter, phonograph record player 3 can be operated in any of its selected modes without regard to the driving of a tape in tape recorder 4 and, conversely, tape recorder 4 can be operated in any of its desired modes without regard to the playing of a record by phonograph record player 3.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

What is claimed is:

1. The combination of a phonograph record player including a rotary turntable for carrying a phonograph record having a record groove with signals recorded in the latter, a pickup having a stylus engageable with the record groove for tracking the latter and reproducing the signals recorded therein, a tone arm carrying said pickup and being movable for lowering and raising said stylus into and out of contact, respectively, with the phonograph record and for said tracking of the record groove by said stylus when the latter contacts the phonograph record, and means actuable for lifting said tone arm to raise said stylus out of contact with said phonograph record and thereby halt the tracking of said record groove by said stylus and the reproducing of said recorded signals by said pickup; a magnetic tape recorder for recording the signals reproduced by said pickup on a magnetic tape and including drive means operative to drive said tape during the recording of said signals thereon, and means actuable for halting the operation of said drive means so as to stop the recording of signals on said tape; detecting means for detecting a halt in the operation of said drive means during the recording by said magnetic tape recorder of the signals being reproduced by said pickup and the phonograph record player; and control means actuating said means for lifting said tone arm in response to the detection by said detecting means of said halt in the operation of said drive means.

2. The combination according to claim 1; in which the magnetic tape is wound on and extends between supply and take-up reels, and said drive means is operative to drive the tape from said supply reel toward said take-up reel and to rotate the latter for winding the tape thereon; and in which said detecting means includes switching circuit means having one state in response to rotation of said take-up reel and another state when rotation of the take-up reel is halted, and said means for lifting the tone arm includes a solenoid connected with said switching circuit means and having one state in response to said one state of the switching circuit means and another state in response to said other state of the switching circuit means.

3. The combination according to claim 1; further comprising second detecting means for detecting the lifting of said tone arm during said recording by the magnetic tape recorder of said signals being reproduced by the pickup of said phonograph record player; and second control means actuating said means for halting the operation of said drive means in response to the detection by said second detecting means of said lifting of the tone arm.

4. The combination according to claim 3; further comprising deactivating means for the first mentioned control means and said second control means to permit operation of said phonograph record player and said magnetic tape recorder independently of each other.

5. The combination according to claim 3; in which the magnetic tape is wound on and extends between supply and take-up reels, and said drive means is operative to drive the tape from said supply reel toward said take-up reel and to rotate the latter for winding the tape thereon.

6. The combination according to claim 5; in which said means for halting the operation of said drive means includes a first stop mechanism for automatically stopping said drive means when the tape is fully unwound from the supply reel and wound on said take-up reel, a second stop mechanism for manually stopping said drive means at will, and a third stop mechanism for causing said drive means to pause in its operation so long as said third stop mechanism is actuated.

7. The combination according to claim 6; in which said second control means includes means for actuating said third stop mechanism when said second detecting means responds to said lifting of the tone arm.

8. The combination according to claim 7; in which said means for lifting the tone arm includes a first lifting mechanism for automatically lifting the tone arm and returning the latter to a rest position upon the completion of the playing of a phonograph record, a second lifting mechanism which is manually actuable at will for lifting the tone arm and returning the latter to said rest position, and a third lifting mechanism which is manually actuable at will for merely lifting the tone arm.

9. The combination according to claim 8; in which said second detecting means includes switch means having one state when said tone arm is lowered to engage said pickup stylus with the phonograph record and another state when said tone arm is lifted, and said means for actuating said third stop mechanism includes a solenoid connected with said switch means and having one state, when said switch means is in said one state, and another state for actuation of said third stop mechanism when said switch means is in said other state of the latter.

10. The combination according to claim 9; in which said first detecting means includes switching circuit means having one state in response to rotation of the take-up reel and another state when rotation of the take-up reel is halted, and said means for lifting said tone arm includes another solenoid connected with said switching circuit means and having one state when said switching circuit means is in said one state thereof and said other solenoid having another state when said switching circuit means is in said other state of the latter.

11. The combination according to claim 10; in which the first mentioned solenoid and said other solenoid are each energized when in said one state thereof and de-energized in said other state thereof; and further comprising means selectively operable to continuously energize said first solenoid and said other solenoid for permitting independent operation of said phonograph record player and said magnetic tape recorder.

* * * * *